US006782322B2

(12) United States Patent
Ireland (10) Patent No.: US 6,782,322 B2
(45) Date of Patent: Aug. 24, 2004

(54) METHOD, APPARATUS AND COMPUTER PROGRAM PRODUCT FOR CREATING REAM SECTION FROM MEMORY DATA BASED ON REAL-TIME REAMING

(75) Inventor: Peter J. Ireland, Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 10/261,292

(22) Filed: Sep. 30, 2002

(65) Prior Publication Data

US 2004/0064258 A1 Apr. 1, 2004

(51) Int. Cl.[7] ............................. G06V 1/40; G01V 1/00
(52) U.S. Cl. ............................................ 702/9; 367/33
(58) Field of Search ................ 702/9, 6, 11; 73/152.44; 367/33

(56) References Cited

U.S. PATENT DOCUMENTS

| | | | |
|---|---|---|---|
| 4,297,879 A | * 11/1981 | Howells et al. | ........... 73/152.02 |
| 4,320,469 A | * 3/1982 | Frawley et al. | ............... 367/33 |
| 4,512,186 A | * 4/1985 | Edwards | ................. 73/152.45 |
| 4,736,297 A | * 4/1988 | LeJeune | ........................ 702/9 |
| 4,794,534 A | * 12/1988 | Millheim | ....................... 702/9 |
| 5,589,825 A | 12/1996 | Pomerleau | |

FOREIGN PATENT DOCUMENTS

| | | |
|---|---|---|
| EP | 0 654 687 A2 | 10/1994 |
| EP | 0 939 195 A2 | 2/1999 |
| EP | 1 160 586 A2 | 5/2001 |
| WO | WO 01/98631 A1 | 6/2000 |

OTHER PUBLICATIONS

"DRILL–PRO", Drum Corps Staff, Oct. 1996.*
"DRILL–PRO", Drum Corps Staff, Oct. 1996.*
Opsah, Runar et al., A Database Model for Drilling Data Storage, Society of Petroleum Engineers vol. SPE 28225, Jul. 31, 1994, pp. 61–66.

* cited by examiner

Primary Examiner—John Barlow
Assistant Examiner—Toan M. Le
(74) Attorney, Agent, or Firm—Brigitte L. Echols; John Ryberg (57) ABSTRACT

A method for generating a depth-indexed data structure for a reaming operation includes receiving, by a software process, i) well logging data that includes time-indexed data and depth measurement data for an oil well drilling rig, ii) a selection identifying a depth range for a reaming operation by the drilling rig, and iii) values for a certain parameter indicating an operating mode for the drilling rig. Then the software process extracts, responsive to the selected depth range and one of the values of the parameter, a section from the well logging data within the selected depth range, and generates from the section the depth-indexed data structure for the reaming operation.

25 Claims, 9 Drawing Sheets

TIME-INDEX DATA FILE 310

TIME INDEX 560

CHANNELS 510

| TIME INDEX | DEPTH | CH 2 | CH 3 | CH 4 | CH 5 |
|---|---|---|---|---|---|
| 131029 | 1450 | 2063.52 | 0.17 | 0.14 | 240.74 |
| 131130 | 1460 | 2065.08 | 0.19 | 0.14 | 217.48 |
| 131231 | 1470 | 2066.74 | 0.21 | 0.12 | 189.22 |
| 131330 | 1480 | 2068.48 | 0 23 | 0 15 | 194.63 |
| 131429 | 1490 | 2070.29 | 0.23 | 0.14 | 195.14 |
| 131530 | 1500 | 2072.16 | 0.24 | 0.13 | 182.12 |
| 131631 | 1510 | 2074.05 | 0.25 | 0.15 | 160.69 |
| 131730 | 1520 | 2076.01 | 0.27 | 0.14 | 142.08 |
| 131830 | 1530 | 2078.06 | 0.29 | 0.13 | 142.86 |
| 131929 | 1540 | 2080.19 | 0.30 | 0.13 | 131.60 |
| 132030 | 1550 | 2082.36 | 0.29 | 0.17 | 126.77 |

*FIG. 5A*

DEPTH-INDEX DATA FILE 320

CHANNELS 510

| DEPTH INDEX | TIME | CH 2 | CH 3 | CH 4 | CH 5 |
|---|---|---|---|---|---|
| 1450 | 131029 | 2063.52 | 0.17 | 0.14 | 240.74 |
| 1460 | 131130 | 2065.08 | 0.19 | 0.14 | 217.48 |
| 1470 | 131231 | 2066.74 | 0.21 | 0 12 | 189.22 |
| 1480 | 131330 | 2068.48 | 0.23 | 0.15 | 194.63 |
| 1490 | 131429 | 2070.29 | 0.23 | 0.14 | 195 14 |
| 1500 | 131530 | 2072.16 | 0.24 | 0 13 | 182.12 |
| 1510 | 131631 | 2074 05 | 0.25 | 0.15 | 160 69 |
| 1520 | 131730 | 2076.01 | 0.27 | 0.14 | 142.08 |
| 1530 | 131830 | 2078 06 | 0.29 | 0.13 | 142.86 |
| 1540 | 131929 | 2080.19 | 0.30 | 0.13 | 131.60 |
| 1550 | 132030 | 2082.36 | 0.29 | 0.17 | 126.77 |

DEPTH INDEX 550

METHOD, APPARATUS AND COMPUTER PROGRAM PRODUCT FOR CREATING REAM SECTION FROM MEMORY DATA BASED ON REAL-TIME REAMING

BACKGROUND OF THE INVENTION

1. Field of the Invention

The present invention relates to data acquisition and logging systems for subsurface resource drilling and more particularly relates to generating data for a reaming operation.

2. Related Art

The exploration for subsurface resources such as hydrocarbons including oil and gas, minerals and water, typically requires various techniques for determining the characteristics of geological formations. Many characteristics, such as the hydrocarbon volume, resistivity, porosity, lithology, and permeability of a formation, may be deduced from certain measurable quantities associated with the geological formations. Drilling for subsurface resources to determine the characteristics of the geological formations is a well known technique. A drilling rig is typically deployed to drill a well for exploring the subsurface resources.

The data acquisition and logging system is typically used to acquire information describing the well characteristics. The information may be acquired in real-time by a sensor equipped drilling tool and communicated to a back-end portion of the logging system for performing additional processing. The term "real-time" data, as used herein, includes data acquired and recorded while the drilling tool is in the well, and transmitted to the surface shortly after being acquired. Transmission typically occurs and is completed substantially while the drilling tool is in the well, and is typically by a method with limited bandwidth, such as mud-pulse telemetry. It is well known that only a subset of the recorded data can be transmitted as real-time data because of the limited data transfer rates of down-hole telemetry systems. This reduces the number of channels, the sample interval, or both, in the real-time data.

In many cases, information may be acquired in a "recorded mode" by the drilling tool, according to which data is acquired and stored in a memory device of the drilling tool. The recorded data may be subsequently retrieved from the memory when the drilling tool is brought to the surface. The term "recorded data," as used herein, includes data stored in the memory of the drilling tool while the drilling tool is in the well. Thus, recorded data are distinct from real-time data.

It is well known that the drilling rig can be operated in several modes such as drilling, reaming, and tripping to penetrate the geological formations. For example, during the drilling operation the drilling bit is described as being "on-bottom". (It should be understood that the term "drilling" has a rather specific meaning when used in the context of operating in a "drilling mode," as just described. The term 'drilling" may also be used in a more general sense, such as in the context of "drilling the well" or "measurement while drilling" ("MWD"), which are mentioned herein below.) In the reaming operation the drilling tool is rotating but its bit is "off-bottom" (i.e. not drilling), regardless of whether the drilling tool is moving up or down. In the tripping mode the drilling tool is being lowered into or pulled out of the oil well, but generally is not rotating. For the purposes of this invention, "reaming" covers both tripping and reaming.

A drilling rig is typically capable of operating only in one mode at a given instant. For example, the rig cannot be reaming and drilling at the same time. Consequently, when the rig is reaming toward bottom, the rig mode automatically changes to the drilling mode as soon as the bit touches the bottom of the hole. Therefore, in data acquisition terms, data acquired in a reaming operation is not "on-bottom".

It should be understood that data acquired in well logging may be acquired over a period of days, weeks or even months and is therefore voluminous. Consequently, the well logging system automatically processes data as it is acquired to make the data more accessible. Typically, a set of data of particular interest is identified by the well logging system by automatically generating a data file for it. Moreover, existing well logging systems typically automatically generate real-time data files only for real-time data acquired on-bottom. In some cases, existing systems can also generate a real-time, "off-bottom" data file, such as a reaming data file (also sometimes referred to as a "ream section"), provided that the system is configured to do so prior to acquiring the data. For recorded-mode data, well logging system flexibility is conventionally even more limited. It should therefore be appreciated that the need exists to create ream section data for a selected depth range after acquiring real-time data without requiring extensive manual data manipulation or repositioning. Furthermore, it would be desirable to facilitate automatic creation of accessible ream section data from both real-time and recorded mode data.

SUMMARY

The foregoing need is addressed by the present invention. According to one form of the invention, a method for generating a depth-indexed data structure for a reaming operation includes receiving, by a software process, i) well logging data that includes time-indexed data and surface measurement data for a drilling rig, ii) a selection identifying a depth range for the reaming operation by the drilling rig, and iii) values for a certain parameter, the values indicating respective operating modes for the drilling rig. Then the software process extracts, responsive to the selected depth range and one of the values of the parameter, a section from the well logging data within the selected depth range, and generates from the section the depth-indexed data structure for the reaming operation—.

In another aspect, the parameter is user-selected. As an alternate, the parameter is program selected.

In an alternative, the parameter is included in the received well logging data.

In still another alternative, the parameter is included in the received well logging data but changeable responsive to a user-selection.

Other forms, as well as additional aspects, objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
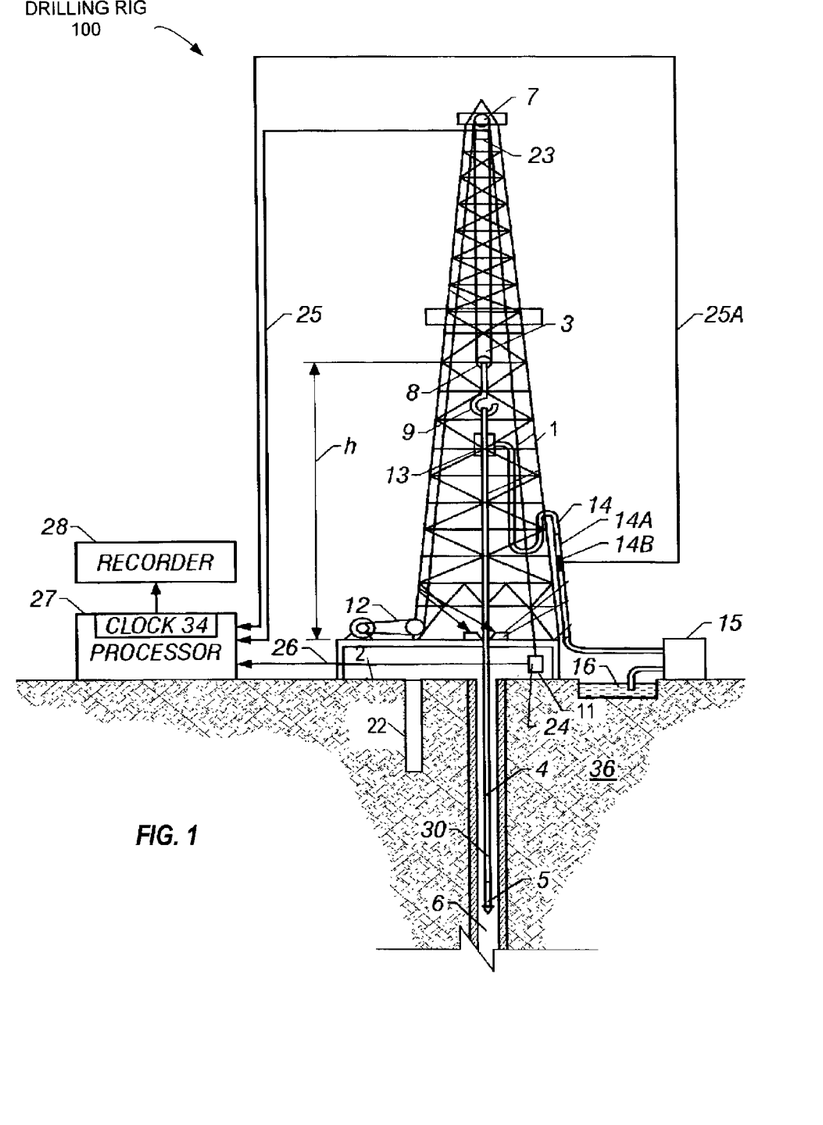
FIG. 1 illustrates a drilling rig and drill string in accordance with an embodiment of the present invention.

FIG. 1 illustrates a drilling rig 100 and drill string with a down-hole data acquisition and logging system for exploring drill hole environment 36. Drill string 4 is suspended from hook 9 by means of swivel 13 linked by hose 14 to mud pump 15, which permits the injection of drilling mud into well 6, via the hollow pipes of drill string 4. Hose 14 is attached to standpipe 14A. Attached to standpipe 14A, one or more sensors 14B receive signals from within the well 6 via mud pulse telemetry. Mud pulse telemetry sensors 14B are coupled via signal line 25A to processor 27. Processor 27 incorporates a clock 34. Accordingly, sensors 14B function as measurement tools for delivering measurements to processor 27 and recorder 28. Processor 27 includes a clock 34 for providing a time measurement, as described in greater detail below. The drilling mud may be drawn from mud pit 16, which may be fed with surplus mud from well 6. The drill string may be elevated by turning lifting gear 3 with winch 12 and the drill pipes may be successively removed from (or added to) well 6 and unscrewed in order to remove bit 5.

The lowermost portion of the drill string 4 may contain one or more tools, as shown as tool 30 for investigating down-hole drilling conditions or for investigating the properties of the geological formations penetrated by the bit 5 and borehole 6. The tool 30 is a logging tool capable of logging one or more different types of measurements and includes at least one measurement sensor. The tool 30 may be equipped for logging measurements of resistivity, gamma ray, density, neutron porosities, calipers and photoelectric effect as may be desired. Further, the tool 30 may be equipped to include sensors for drilling-related measurements such as direction, depth, inclination and include equipment for data recording and telemetry.

Variations in height h of traveling block 8 during drill string raising operations are measured by means of sensor 23, which may be an angle of rotation sensor coupled to the faster pulley of crown block 7. Sensor 23 and strain gauge 24 are connected by signal lines 25 and 26 to a processor 27 which processes the measurement signals.

Figure 2:
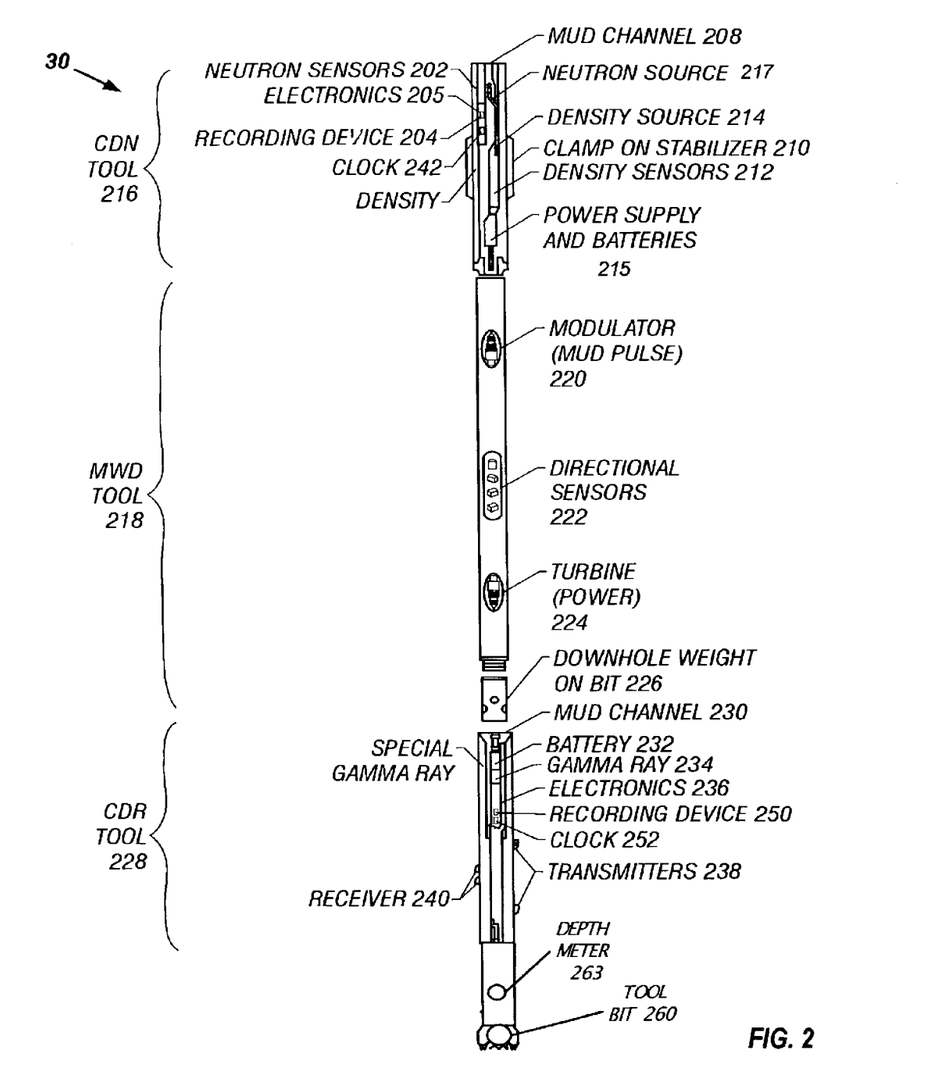
FIG. 2 illustrates a drilling bottom hole assembly (BHA) with several tools appropriate for embodiments of the present invention.

Referring to FIG. 2, a more specific view of the tool 30 is shown. The tool 30 includes equipment according to an embodiment of the present invention appropriate for logging while drilling (LWD) and measurement while drilling (MWD), as design requirements may dictate. MWD data may include data acquired during both drilling and reaming, is typically indexed in time, and may or may not include recorded data. For certain applications, time-indexed data is of primary interest, but some data is of interest indexed in depth, e.g., the distance along the borehole. Typically, a main log includes "on-bottom" data acquired when a sensor associated with the drilling tool passes in front of a zone of interest for the first time. The sensor is likely to pass that zone of interest several more times during the course of drilling the well. Data for these subsequent passes, generally referred to as "reaming passes" may be of interest to be viewed as depth-indexed data.

As shown, the tool 30 includes three portions, each of which may be included or excluded from the tool 30, as measurement system requirements require. The tool 30 may include a compensated dual resistivity tool (CDR) or other type of resistivity tool 216, a measurement-while-drilling (MWD) tool 218, a compensated density neutron (CDN) tool 228, as well as other known specific measurement type tools. Each of the CDR, MWD and CDN type tools, as chosen are coupled together to form the tool 30. Specifically, a CDN tool 216 includes neutron sensors 202, a neutron source 217, a density source 214, clamp on stabilizers 210, density sensors 212 and power supply and batteries 215. The CDN tool 216 further provides a mud channel 208 that allows mud to flow through the tool 216. CDN tool 216 further includes electronics 205, which may include a recording device and a clock.

The CDN tool 216 can be coupled above an MWD tool 218. The MWD tool 218 includes a modulator 220 for transmitting via the mud channel 208, directional sensors 222 configured to triangulate the location of tool 30 and a turbine 224 configured to provide power to the tool 30. The MWD tool 218 further includes a down-hole weight for a bit 226, which includes torque sensors. The MWD tool 218 may be coupled to a CDR tool 228. The CDR tool 228 is shown including a mud channel 230 that flows through the tool 30, battery 232, gamma ray equipment 234, electronics 236, transmitters 238 and receivers 240. As one of skill in the art appreciates, the number of transmitters and receivers is according to design requirements. Electronics 236 includes a recording device 250 coupled to a clock 252. The CDR tool 228 or the MWD tool 218, determined according to the configuration chosen for the tool 30, are coupled to a motor and a drill bit 260 configured to drill in the drill hole environment 36.

LWD tools, which include the CDN tool 216, the CDR tool 228 and the MWD tool 218 provide measurements that indicate a hole trajectory and provide drilling mechanics measurements in real time. LWD measurements provide resistivity, neutron, density and gamma ray measurements, among other measurements in real time. Generating off-bottom data, after the drilling is complete, is desirable, as it might not be recognized during the drilling process that this data will be of interest. A further benefit of LWD and MWD is that the measurements stored in recording devices 204 and 250, may be combined with wireline logs for a complete evaluation of the formation 36.

Wireline logs are typically taken down hole, transmitted through the wireline to the surface based computer systems and recorded at the surface. MWD and LWD logs are also typically taken down-hole. They are either transmitted to the surface based computer systems by mud pulses, or else recorded down-hole by the recorder 28 and retrieved later when the tool 30 is brought to surface (or both, typically). Mud logs that describe samples of drilled cuttings are taken and recorded on surface.

The data acquisition and logging system that includes the tool 30, according to an embodiment of the present invention, is equipped for generating ream section data, preferably after completing the data acquisition. LWD and MWD tools include sensors, such as transmitter 238 and receiver 240 that measure different characteristics of the formation. In practice, the drilling of a well, e.g., an oil or gas well, requires repeated movement of the sensors of the tool 30 over a same area. For example, when the tool bit 260 requires replacement, the tool 30 is removed from the well and replaced. Further, during the course of drilling a well, the drill bit and drill string will be "reciprocated" or "reamed" within the borehole (moving it up and down) to assist in cleaning the hole (ensuring the cuttings are circulated to surface) and general hole conditioning. Thus, during the drilling of a well, the tool 30 retracts repeatedly during the course of drilling and measuring the geological formation.

In an embodiment, the tool 30 is configured to take advantage of the repeated retracting and insertion of the tool 30. More particularly, in the embodiment, a clock, such as clock 252 within the tool 30, or clock 34 outside the tool 30, is synchronized with a depth measurement of the tool 30 to operate measurement tools within the tool 30 that log measurements of resistivity, gamma ray, density, neutron porosities, calipers and photoelectric effect. According to the embodiment, the tool 30 repeatedly correlates one or more predetermined depths or zones of interest, or the entire depth zone in some cases, with a time parameter and associates the correlated time/depth measurement with the qualitative log measurements.

Figure 3:
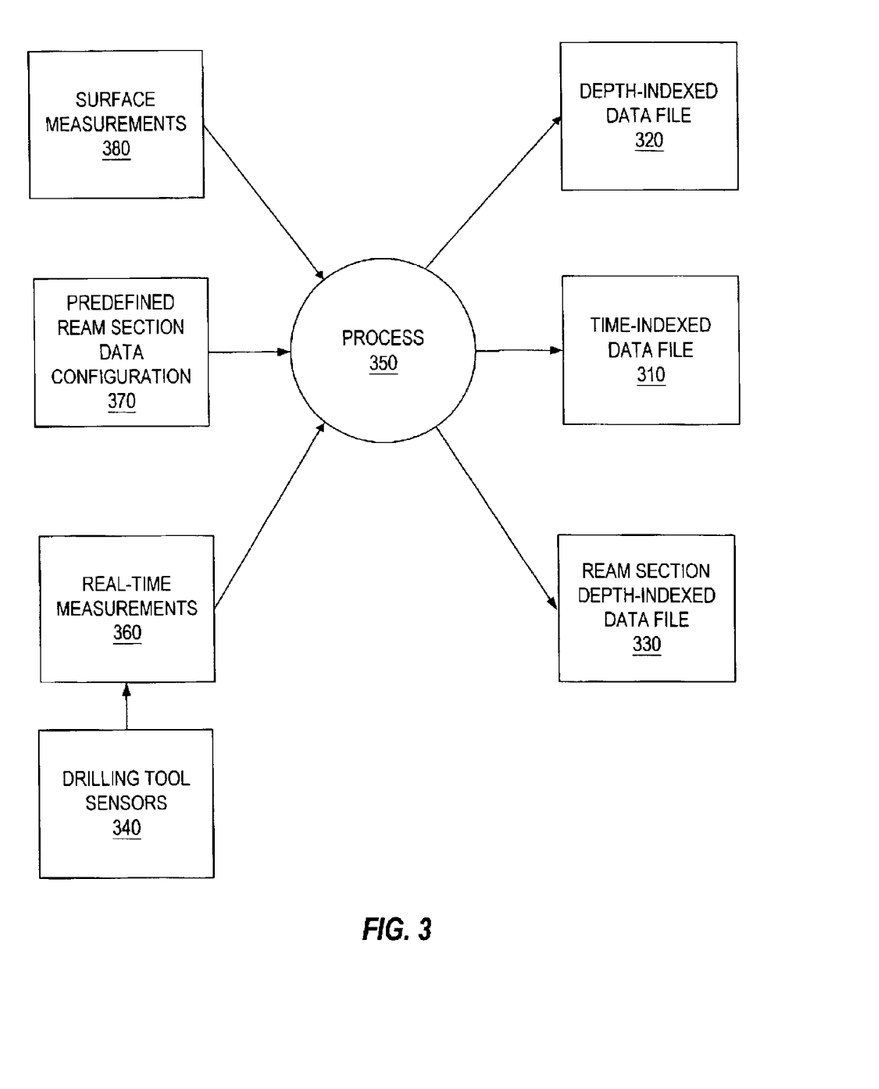
FIG. 3 illustrates a block diagram for generating ream section data from real-time data, according to an alternative embodiment.

Referring to FIG. 3 in conjunction with FIG. 1, a block diagram is illustrated for generating ream section data from real-time data, according to one embodiment. All measurements are acquired in time at certain indices, i.e., acquired as time-indexed data. A separate measurement of depth is made. These two measurements are combined or 'gated', for example by considering on-bottom data, to give a profile of measurement versus depth, which is often the desired product.

The drilling tool 30 typically acquires real-time measurements 360 obtained from sensors 14B. Surface measurements 380, which are typically acquired above the drill hole 6, generally include depth measurement and other measurements, such as hookload and surface torque, that allow the creation of a time/depth profile. The depth measurement is computed by measuring the length of the drill string 4. A process 350, which is typically a software program, generates a time-indexed data file 310 that includes recorded real-time measurements 360 and surface measurements 380. That is, file 310 is generated by process 350 as an output in response to receiving the real-time measurements 360 and surface measurements 380 as inputs.

The time-indexed data file 310 includes values for each of the measured variables arranged in a particular format, e.g., tabular. Each row of the time-indexed data file 310 is identified by a unique time index, and each column includes values for the measured variable corresponding to the unique time index.

This is a simplification of reality. The data channels may be irregularly sampled, and the time indices used for one channel may be different from those used for a different channel. However, the data channels may be placed on a "grid". A grid is a term that is used to describe when all the data is placed in a table with the same index. For example, if data for channel 1 was sampled at 5, 15, 30, 45 seconds and data for channel 2 was sampled at 10, 25, 45 seconds, then a grid may be prepared by combining values for channel 1 and channel 2 in the same table which has an index of 5, 10, 15, 25, 30, 45—and a column for each channel. The channel columns would have gaps or null values where there was no data. The process of preparing a grid may be described as "gridding". "Gaps" if present may be filled by the gating process described earlier.

To assist in mapping between time and depth domains, it is common to dedicate one channel of the time-indexed data file 310 for depth measurement. The depth data is acquired separately as it is a measurement from surface (the rig) rather than downhole. This is generally sampled at a much higher sampling rate than the well log data. It can be thought of as on the same grid—as mentioned above.

Once acquired the contents of the time-indexed data file 310 are static, e.g., the contents of the data file do not change. In some cases, if a parameter used to calculate the file is incorrect, the data is re-processed or re-computed using a new value of that parameter. However, this generally creates a new file.

In addition, the process 350 includes functionality to map time-domain data to the depth-domain. An example of an output of the process 350 is the depth domain data stored in file 320. This is a lossy mapping, since the depth domain output of process 350 into file 320 only includes on-bottom data. Thus, by considering on-bottom data, which includes first instances in time of measurements at each recorded depth, process 350 also generates a depth-indexed data file 320 as an output. The depth-indexed data file 320 includes values for each of the measured variables. Each measured variable, displayed in a column, is often referred to as a 'channel' or a 'field'. Each row of the depth-indexed data file 320 is identified by a unique depth index, and each column includes default, on-bottom values for the measured variable corresponding to the unique depth index. Further details of the depth-indexed data file 320 are illustrated in FIG. 5B. It is common to dedicate one channel of the depth-indexed data file 320 for time measurement to assist with traceability. Once acquired, the contents of the depth-indexed data file 320 is static, according to the alternative of FIG. 3. In some cases, if a parameter used to calculate the file is incorrect, the data is re-processed or re-computed using a new value of that parameter. However, this generally creates a new file.

The process 350 also generates a depth-indexed, real-time, ream section data file 330 (also referred to as "data from a ream pass," or simply "a ream pass") in response to receiving a predefined ream section data configuration 370 as input. The configuration 370 includes a definition of ream log characteristics such as an up-ream or down-ream log. This ream section data is collected while the bit is off-bottom and until the process 350 is stopped or the drill bit reaches the bottom, i.e., starts drilling. Data collected for the additional depth-based data set is output as the depth-indexed, ream section data file 330. However, in the alternative of FIG. 3 the process 350 does not permit creating new, i.e., not predefined, ream logs on the real-time data after the data has been acquired.

Figure 4:
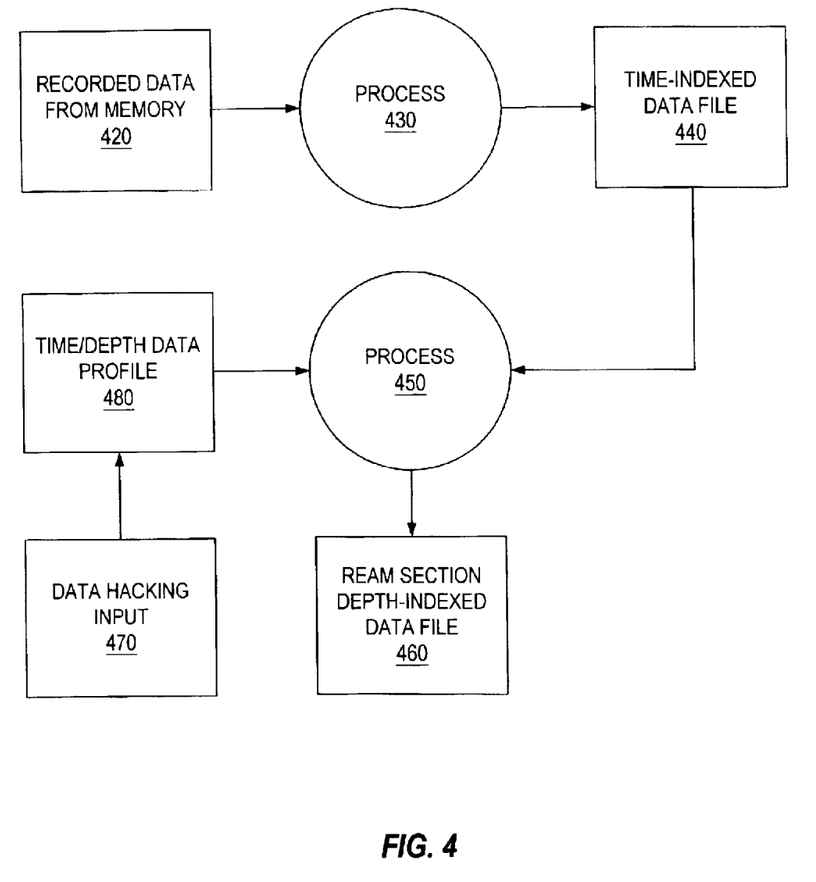
FIG. 4 illustrates a block diagram for generating ream section data from recorded data, according to an alternative.

Referring to FIG. 4, a block diagram is illustrated for generating ream section data from recorded data, according to an alternative. Generally, the data acquisition and logging system generates data files for measurements that it believes are "on-bottom". Properties of the ream section data described in FIG. 3 are not automatically inherited by data files created from the recorded mode data. To generate ream sections for recorded-mode data according to this alternative requires that a user manually manipulate or "hack" the time/depth profile so that a section of the data appears to the system to be "on-bottom" data, for which the system consequently creates a depth-based data file.

As described earlier, the drilling tool 30 acquires and stores in memory well data obtained while the drilling tool 30 is in the drill hole. When the drilling tool 30 and its memory device is retrieved from the well, the contents of the memory are transferred to a recording of the data 420. A process 430, e.g., a software program, generates a time-indexed data file 440 as an output in response to receiving the recorded data 420 as an input. The time-indexed data file 440 is typically correlated with the time-indexed data file 310 (FIG. 3) for synchronization. Further details applicable to the time-indexed data files 310 and 440 are illustrated herein below in FIG. 5B.

A process 450, e.g., a software program, reads inputs from i) the time-indexed data file 440, and ii) a time/depth data profile file 480, typically stored as an ASCII file. A manual data hacking input 470 from a user is applied to the time/depth data profile file 480. The time/depth data profile file 480 is a result of the process 350, based on the input of surface measurements 380. The time/depth profile information stored in the time/depth data profile file 480, is used to determine if data is on-bottom or off-bottom. Much of the data included in the time/depth data profile file 480 must be manually removed or "hacked" to fool the system into thinking that it was on-bottom data. The data hacking input 470 includes copying the file 480, deleting rows of data not in the selected depth range, and deleting rows that are the first instance of a depth. From these numerous inputs the process 450 generates a ream section depth-indexed data file 460. Further detail of the time/depth profile information is described in FIG. 6.

Figure 5A:
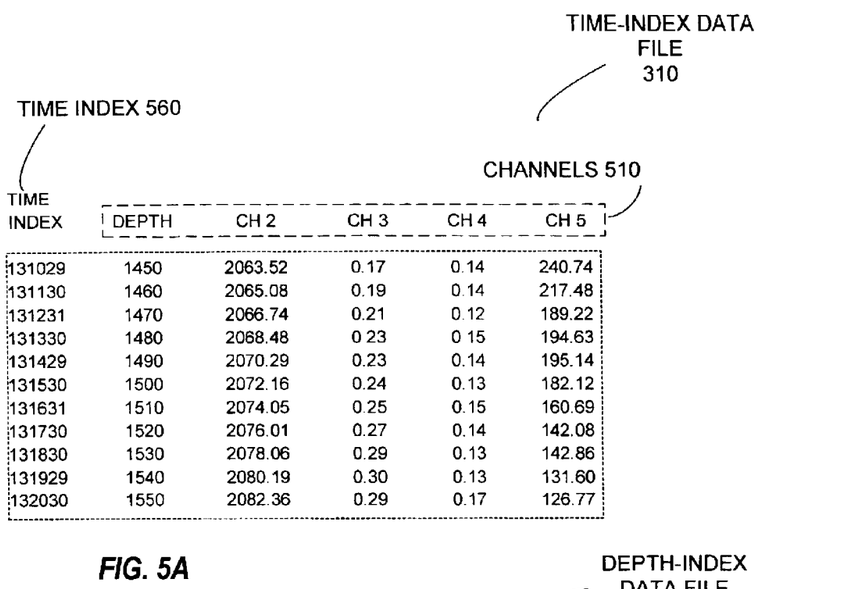
FIGS. 5A and 5B illustrate further detail of a time-indexed and a depth-indexed data file, according to an alternative.
Figure 5B:
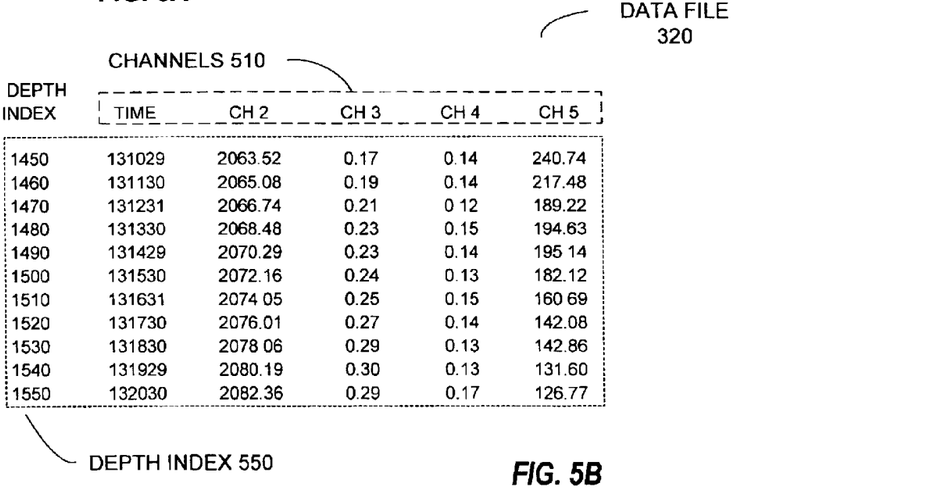

Referring to FIGS. 5A and 5B, additional detail of depth-indexed and time-indexed data files are illustrated, according to the alternatives of FIGS. 3 and 4. The time-indexed data file 310 includes data arranged in a tabular format, as illustrated in FIG. 5A. The format illustrated for file 310 may also apply to time indexed file 440 (FIG. 4). A time index 560, which is typically the first column, is used an as index to the table. Each row in the time index has a unique entry. The time-indexed data file 310 includes on-bottom and off-bottom measured variables or channels 510 that are arranged in columns. DEPTH channel displays depth values for each corresponding time-index.

Similarly, the depth-indexed data file 320 includes data arranged in a tabular format, as illustrated in FIG. 5B. A depth index 550, which is typically the first column, is used an as index to the table. In this case, the first column is, by definition, the index. An index is chosen when the file is created—and is always going in the same direction—e.g. increasing or decreasing. Each row in the depth index has a unique entry. The depth-indexed data file 320 includes on-bottom measured variables or channels 510 that are arranged in columns. TIME channel displays time values for each corresponding depth-index.

Typically, data is oversampled in time—meaning that several points might need to be averaged to generate a single point in depth, the average being one choice as determined by the gating function. This would make the data files 310 and 320 look different and more complex. The data files 310 and 320 as represented are suitable for illustration purposes.

Figure 6:
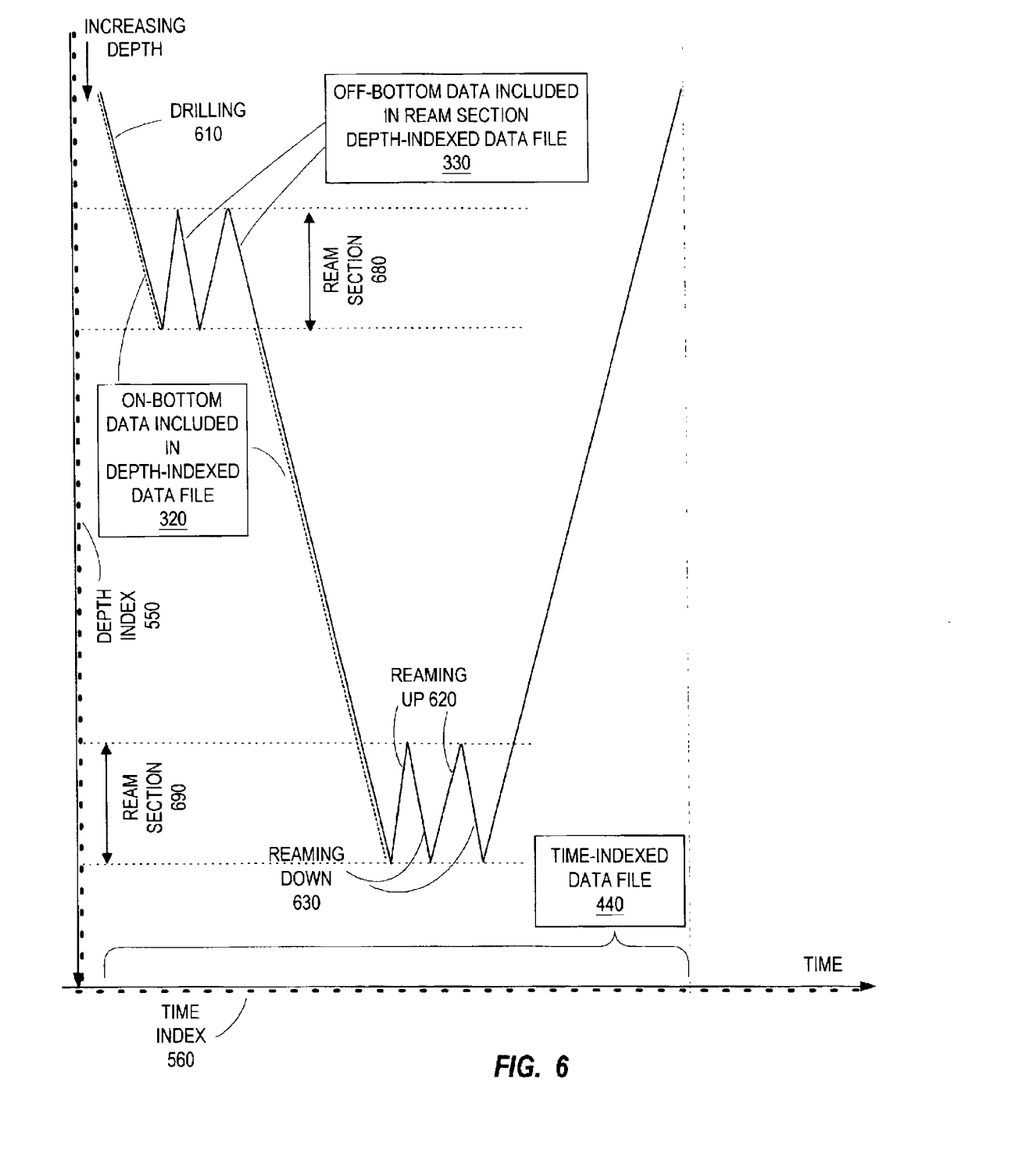
FIG. 6 illustrates a time/depth profile of oil well data, according to an alternative.

Referring to FIG. 6, time/depth profile information is illustrated. The time/depth profile information is typically generated simply by plotting the value of depth on the y-axis versus the time-index on the x-axis. The time/depth profile may be generated by using various data sources such as the time-indexed data file 310 or surface measurements 380. The depth of an oil well, which may vary from a few hundred feet to several thousand feet, increases from the top to the bottom of the depth (y) axis. The time (on the x-axis) from start to finish of a drilling operation of a well may vary from minutes to several days.

Measurements for channels 510 (FIG. 5) are made at certain intervals. The sampling for the measurements may be made at regular or irregular intervals. Time indices 560 are shown having a regular interval on the time (x) axis in FIG. 6. These measurements are stored as data in the time-indexed data file 310 (or 440). Similarly, measurements for channels 510 are made at substantially regular intervals on the depth axis and are shown as depth indices 550 in FIG. 6. The on-bottom measurements are stored as data in the depth-indexed data file 320 (FIG. 3).

Various modes of operation of the drilling rig, such as drilling 610, reaming up 620 and reaming down 630, are illustrated. Ream sections 680 and 690 that correspond to a range of depth-indices 550 are identified. The ream section 680 generates ream section depth-indexed file 330, as illustrated.

The diagram shows several ream sections 680. These would each be put into separate files by separate selections. Having selected to generate ream data over a section, the "first" data point will be used—using similar logic to the "on-bottom" logic.

Figure 7:
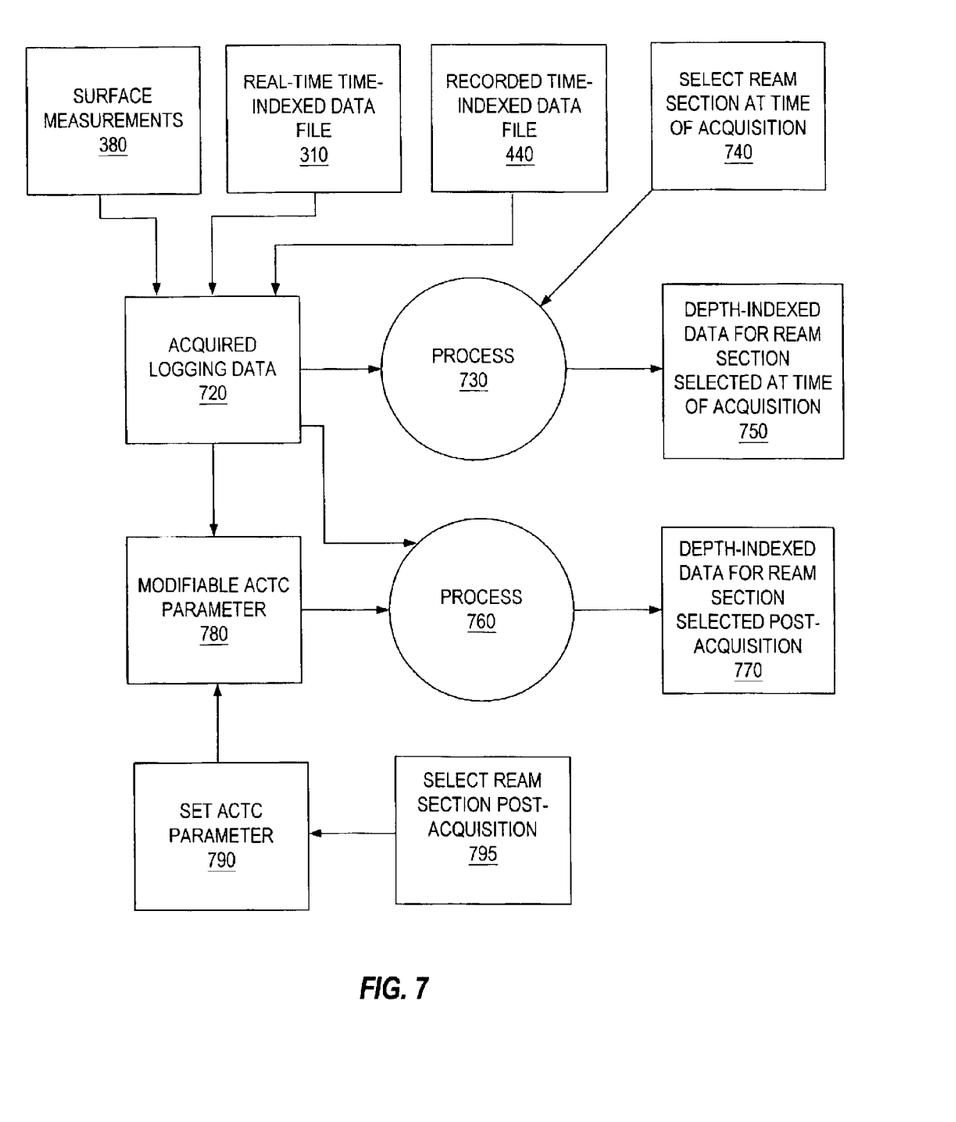
FIG. 7 illustrates a block diagram for generating ream operation data, according to an embodiment of the present invention.

Referring to FIG. 7, a block diagram is illustrated for generating reaming data, according to a preferred embodiment. A process 730, e.g., a software program, receives logging data 720 and a ream section selection 740 as inputs. The acquired logging data 720 includes data from the real-time time indexed data file 310, and the surface measurements 380 (FIGS. 3 and 6) and the recorded-mode data file 440 (FIGS. 4 and 6). In one embodiment, real-time data file 310 may be used as input data instead of file recorded-mode data file 440. The surface measurements 380 provide the time/depth profile, useful for distinguishing on-bottom and off-bottom data.

An activity code ("ACTC") parameter is a code used in drilling that indicates the activity being currently performed on the drilling rig. The time/depth profile 380 includes initial values for the ACTC parameter. The ACTC essentially is a measurement associated with the rig's activity—thus fits with the surface measurements 380 included in a real-time data file. The data file 310 provides time-indexed real-time data. The data file 440 provides time-indexed recorded-mode data. The acquired time-depth profile included in surface measurements 380 may indicate many ream sections, such as ream section 680 and 690 of FIG. 6. The select ream section 740 selects depths for at least one ream section of interest. In response to these inputs, the process 730 identifies on-bottom and off-bottom acquired logging data associated with the ream section of interest 750.

In one alternative embodiment, a ream pass could be made every time the drilling tool changed direction (which in turn would change the ACTC parameter, which could be interpreted). However, this technique of generating a ream pass would generate excessive data so only the reaming data of interest, as indicated by the selected ream section, is considered.

In an embodiment, ACTC=0 indicates drilling 610, ACTC=1 indicates reaming up 620, and ACTC=2 indicates reaming down 630. Changing the ACTC parameter of the acquired logging data 720 redefines or simulates a new drilling activity, as viewed by the back end systems. The new ACTC parameter allows the back-end system to generate new depth-indexed data that appears to be or simulates on-bottom data. By setting or modifying the value of the ACTC parameter within the ream section of interest 750 it is possible to generate or re-generate ream section data. An ACTC_offset parameter is defined that specifies an offset from an initial value of the ACTC parameter to change the ACTC parameter. A program or user may select a ream section post-acquisition 795. A program or user can change a range of ACTC parameters starting with the defined ACTC_offset. The selection of the ream section post-acquisition 795 is received as an input by the program and in response the ACTC parameter is set 790. That is, the program or user changes the ACTC value between a ream section starting point and a ream section ending point specified within the ream section of interest. In one embodiment, the recorded mode data processing can "inherit" the ACTC selections made during real-time. An ACTC parameter change from 0 to 1 will start a ream data file generation operation. Changing ACTC from 1 to 0 will stop the ream data file generation operation. Thus changing ACTC parameters provides control to perform data generation operations for selected ream sections of interest.

Figure 8:
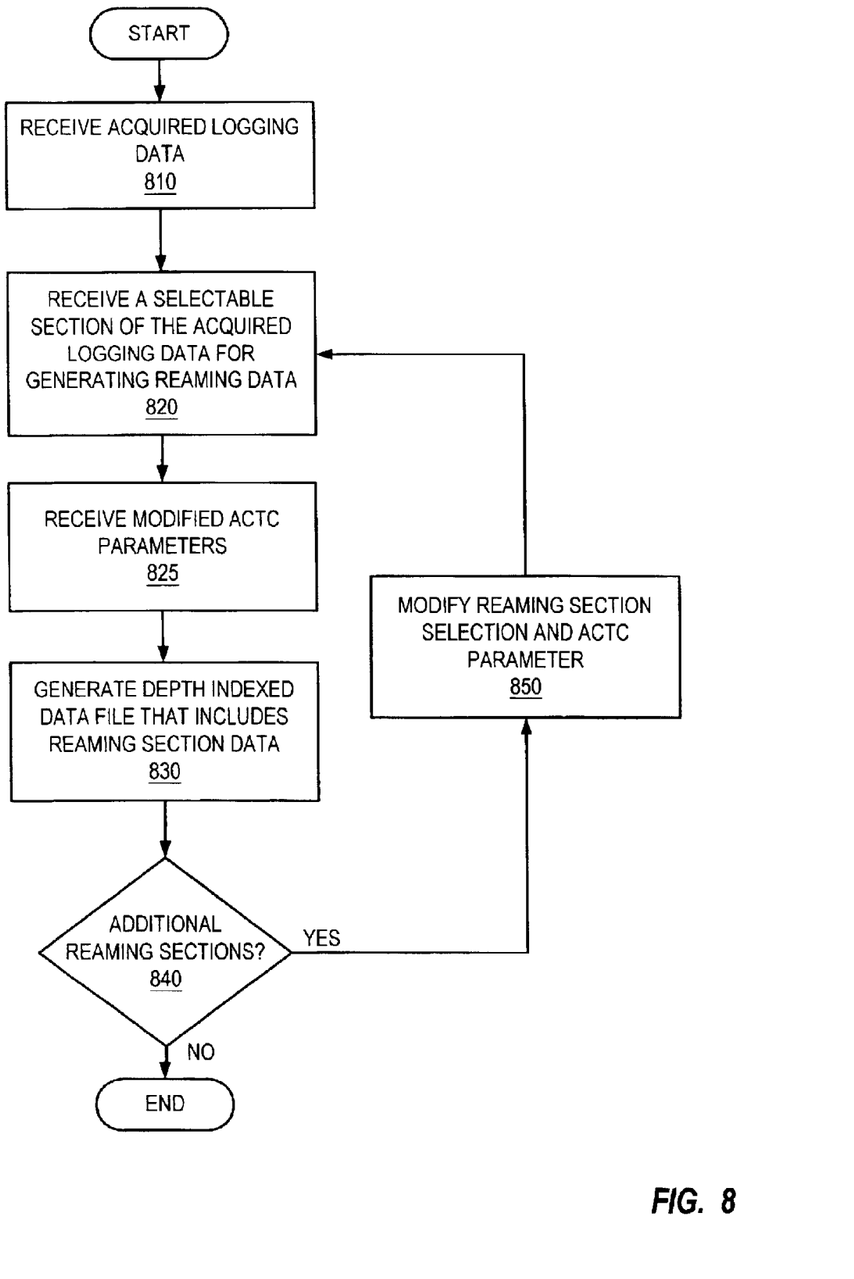
FIG. 8 is a flow diagram illustrating a method for generating ream operation data, according to a preferred embodiment of the present invention.

A process 760, e.g., a software program, receives the acquired well log data 720 similar to the process 730, however with a modified version of ACTC parameter 780. The process 760 combines the acquired logging data 720 with the changed ACTC parameter codes to trigger the generation of the ream section depth-indexed data file 770 as output. Referring to FIG. 8, a flow diagram for a method of generating ream operation data is illustrated, according to an embodiment of the present invention. The technique is applicable for real-time and/or recorded data. In step 810, the acquired logging data is received. The acquired logging data includes time/depth profile data included in surface measurements 380 distinguishing the on-bottom and off-bottom measurements included in the recorded time-indexed data 310 or 440.

In step 820, a section of the acquired data is selected for generating reaming data. In one embodiment, the selection is performed by selecting a range of depth-indices 550. Examples of a selecting a ream section include selecting one of ream sections 680 or 690. In step 825, modified values of the ACTC parameter for the selected ream section are received. In step 830, depth-indexed data files for the selected reaming sections are generated in response to the changed ACTC parameter.

In step 840, it is determined whether data for additional reaming sections needs to be generated. In step 850, the additional reaming section and the new ACTC parameter is selected, and steps 820, 825 and 830 are repeated.

Various steps of FIG. 8 may be added, omitted, combined, altered, or performed in different orders. For example, in one embodiment, steps 820 and 825 may be combined. That is, by selecting a reaming section the new values of the ACTC parameter may be automatically changed and received.

Figure 9:
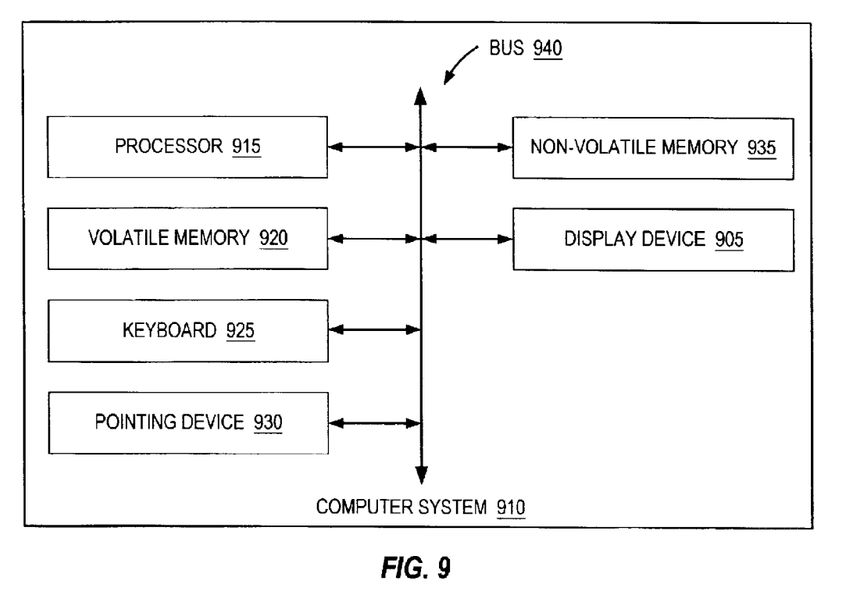
FIG. 9 is a computer system appropriate for implementing one or more embodiments of the present invention.

Referring now to FIG. 9, a computer system 910 is shown that is generally applicable for the various embodiments described. The system 910 includes a processor 915, a volatile memory 920, e.g., RAM, a keyboard 925, a pointing device 930, e.g., a mouse, a nonvolatile memory 935, e.g., ROM, hard disk, floppy disk, CD-ROM, and DVD, and a display device 905 having a display screen. Memory 920 and 935 are for storing program instructions, which are executable by processor 915 to implement various embodiments of a method in accordance with the present invention. The memory 920 and 935 may be used to store portions of the time-indexed data sets. Components included in system 910 are interconnected by bus 940. A communications device (not shown) may also be connected to bus 940 to enable information exchange between system 910 and other devices such as other computer systems via a network such as the Internet.

In various embodiments system 910 takes a variety of forms, including a personal computer system, client/server system, mainframe computer system, parallel processing computer system, workstation, Internet appliance, PDA, an embedded processor with memory, etc. That is, it should be understood that the term "computer system" is intended to encompass any device having a processor that executes instructions from a memory medium.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention.

Various other embodiments having various modifications may be suited to a particular use contemplated, but may be within the scope of the present invention. For example, those of ordinary skill in the art will appreciate that the hardware and methods illustrated herein may vary depending on the implementation. Also, while the present invention has been described in the software process generating data files, those of ordinary skill in the art will appreciate that data files are just one example of a data structure the software process may generate to make the well logging data more accessible. Other data structures may alternatively be generated, such as a random access database. Additionally, it is important to note that while the present invention has been described in the context of a computer system having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, CD-ROM, CD-RW, DVD and transmission-type media such as digital and analog communications links.

To reiterate, many additional aspects, modifications and variations are also contemplated and are intended to be encompassed within the scope of the following claims. Moreover, it should be understood that in the following claims, actions are not necessarily performed in the particular sequence in which they are set out.

What is claimed is:

1. A method for generating depth-indexed data corresponding to well logging data collected during at least one reaming operation, the method comprising:

receiving, by a software process, i) the well logging data for a drilling ring including time-indexed data collected during the at least one reaming operation, ii) a selection of a section of the well logging data for generating reaming data, said selection of section data being made by identifying a depth range for the at least one reaming operation by the drilling rig, and iii) values for a parameter, the values indicating respective operating modes for the drilling rig during the identified depth range the values being modifiable after the well logging data collection;

extracting, by the software process respective to the selected depth range and one of the values of the parameter, a section from the well logging data within the selected depth range; and generating from the section the depth-indexed data corresponding to the data collected during the at least one reaming operation.

2. The method of claim 1, wherein the parameter is included in the received well logging data but changeable responsive to a user-selection.

3. The method of claim 1, comprising:

re-generating the reaming operation data by the process responsive to a user-selected modification of a value of the parameter.

4. The method of claim 1, wherein a first value of the parameter is modified by a user or a program after the well logging data has been acquired, wherein first value is indicative of a simulated operating mode of the drilling rig.

5. The method of claim 1, wherein the well logging data is acquired in a real-time mode or a recorded mode.

6. The method of claim 5, wherein the well logging data acquired in the recorded mode includes the values of the parameter selected during a real-time mode.

7. The method of claim 1, wherein the well logging data is received by the software process from well logging sensors while the sensors are in the well.

8. The method of claim 1, wherein the well logging data is received by the software process from a memory that accompanied a drilling tool down the well while the well was being drilled, the data from the memory being received by the process after the drilling tool has been removed from the well.

9. A data acquisition and logging system operable to generate depth-indexed data corresponding to well logging data collected during at least one reaming operation, the system comprising:

a processor; and a memory storing instructions operable with the processor, the instructions being executed for:

receiving, by a software process, i) the well logging data for a drilling rig including time-indexed data collected during the at least one reaming operation, ii) a selection of a section of the well logging data for generating reaming data, said selection of section data being made by identifying a depth range for the at least one reaming operation by the drilling rig, and iii) values for a parameter, the values indicating respective operating modes for the drilling rig during the identified depth range, the values being modifiable after the well logging data collection;

extracting, by the software process responsive the selected depth range and one of the values of the parameter, a section from the well logging data within the selected depth range; and generating from the section the depth-indexed data corresponding to the data collected during the at least one reaming operation.

10. The system of claim 9, wherein the parameter is included in the received well logging data but changeable responsive to a user-selection.

11. The system of claim 9, comprising:

re-generating the reaming operation data by the process responsive to a user-selected modification of a value of the parameter.

12. The system of claim 9, wherein a first value of the parameter is modified by a user or a program after the well logging data has been acquired, wherein the first value is indicative of a simulated operating mode of the drilling rig.

13. The system of claim 9, wherein the well logging data is acquired in a real-time mode or a recorded mode.

14. The system of claim 13, wherein the well logging data acquired in the recorded mode includes the values of the parameter selected during a real-time mode.

15. The system of claim 9, wherein the well logging data is received by the software process from well logging sensors while the sensors are in the well.

16. The system of claim 9, wherein the well logging data is received by the software process from a memory that accompanied a drilling tool down the well while the well was being drilled, the data from the memory being received by the process after the drilling tool has been removed from the well.

17. A computer program product for a data acquisition and logging system operable to generate depth-indexed data corresponding to well logging data collected during at least one reaming operation, the computer program product comprising:

instructions for receiving, by a software process, i) the well logging data for a drilling rig, ii) a selection of a section of the well logging data for generating reaming data, said selection of section data being made by identifying a depth range for the at least one reaming operation by the drilling rig, and iii) values for a parameter, the values indicating respective operating modes for the drilling rig during the identified depth range, the values being modifiable after the well logging data collection;

instructions for extracting, by the software process responsive to the selected depth range and one of the values of the parameter, a section from the well logging data within the selected depth range; and instructions for generating from the section the depth-indexed data corresponding to the data collected during the at least one reaming operation.

18. The computer program product of claim 17, wherein the parameter is user-selected or program selected.

19. The computer program product of claim 17, wherein the parameter is included in the received well logging data but changeable responsive to a user-selection.

20. The computer program product of claim 17, comprising:

re-generating the reaming operation data by the process responsive to a user-selected modification of a value of the parameter.

21. The computer program product of claim 17, wherein a first value of the parameter is modified by a user or a program after the well logging data has been acquired, wherein the first value is indicative of a simulated operating mode of the drilling rig.

22. The computer program product of claim 17, wherein the well logging data is acquired in a real-time mode or a recorded mode.

23. The system of claim 22, wherein the well logging data acquired in the recorded mode includes the values of the parameter selected during a real-time mode.

24. The computer program product of claim 17, wherein the well logging data is received by the software process from well logging sensors while the sensors are in the well.

25. The computer program product of claim 17, wherein the well logging data is received by the software process from a memory that accompanied a drilling tool down the well while the well was being drilled, the data from the memory being received by the process after the drilling tool has been removed from the well.

* * * * *